E. W. FUHR.
EXTENSION CAR STEP.
APPLICATION FILED FEB. 14, 1908.

909,577.

Patented Jan. 12, 1909.

2 SHEETS—SHEET 1.

Witnesses.
Robert Evitt.

Inventor:
Eugene W. Fuhr.
By James L. Norris.
Atty.

E. W. FUHR.
EXTENSION CAR STEP.
APPLICATION FILED FEB. 14, 1908.
909,577.
Patented Jan. 12, 1909.
2 SHEETS—SHEET 2.
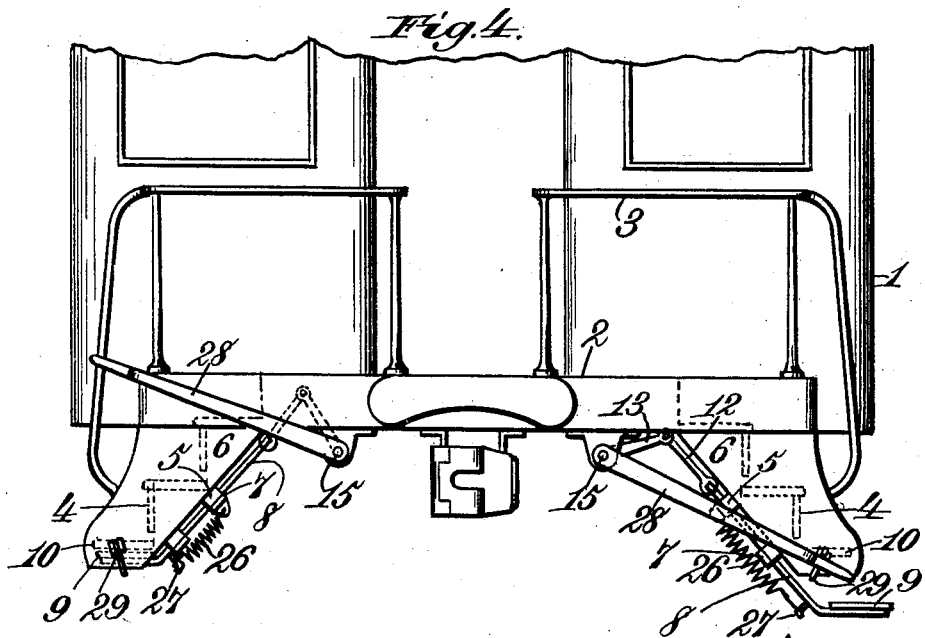
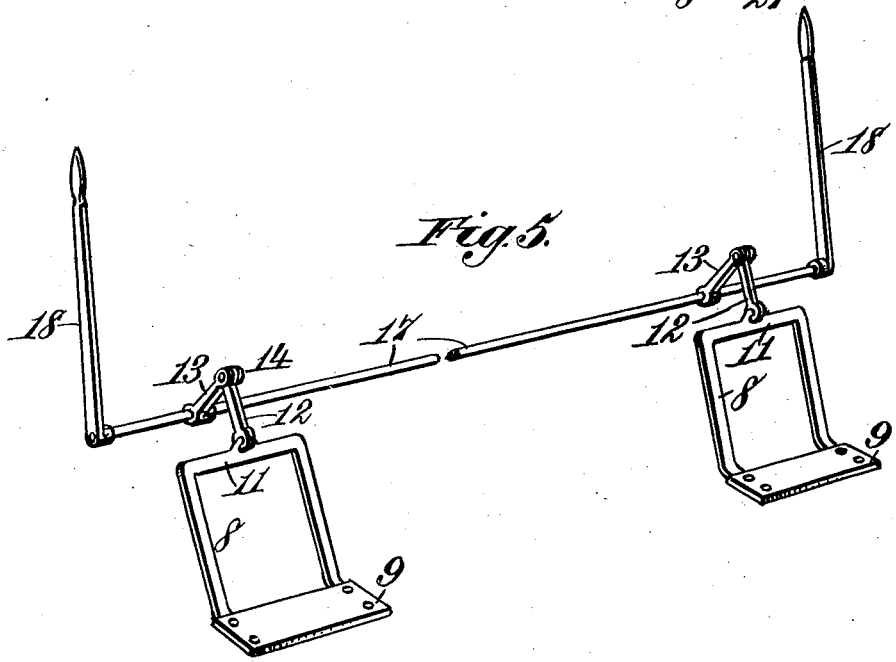
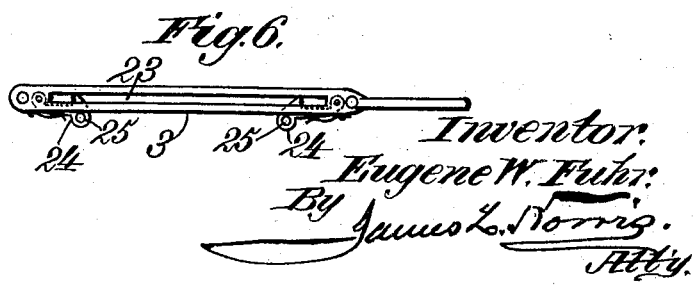

UNITED STATES PATENT OFFICE.

EUGENE W. FUHR, OF VINELAND, NORTH CAROLINA.

EXTENSION CAR-STEP.

No. 909,577.   Specification of Letters Patent.   Patented Jan. 12, 1909.

Application filed February 14, 1908. Serial No. 415,875.

*To all whom it may concern:*

Be it known that I, EUGENE W. FUHR, a citizen of the United States, residing at Vineland, in the county of Columbus and State of North Carolina, have invented new and useful Improvements in Extension Car-Steps, of which the following is a specification.

This invention relates to car step structures and particularly to what is known as extension steps coöperating with the ordinary form of fixed car steps, and consists essentially in the novel arrangement and combination of parts which will be more fully hereinafter specified.

The primary object of the invention is to provide car steps with a simple and efficient extension step and coöperating mechanism whereby the step movably arranged to be lowered in relation to a fixed step structure may be manually controlled, and the extension steps on the opposite sides of the car unitedly or simultaneously disposed in operative and inoperative positions, or independently operative, or similar extension steps at opposite ends of the car unitedly or independently movable and controllable from either end of the car.

The improved extension step organization may be operated either from the car platform or from a point adjacent to the side of a car, and it will be understood that the advantages of this extension step organization are disposition for service when a car has come to a full stop, and elevation into inoperative position when the car is moving to avert accidents to persons attempting to board a car platform when the car is in motion by having the fixed step so high that it cannot be conveniently reached and to facilitate exit of passengers from a car when the latter has come to a full stop and the extension step is lowered.

A further advantage in the present organization is that it may be readily applied to cars now in use without requiring a material change or disorganization of the usual car structures.

Figure 1:
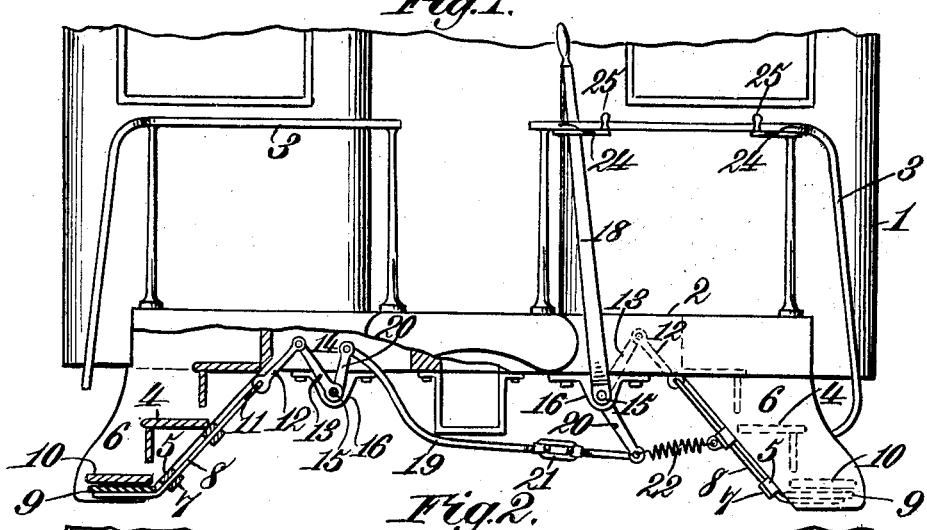
Figure 2:
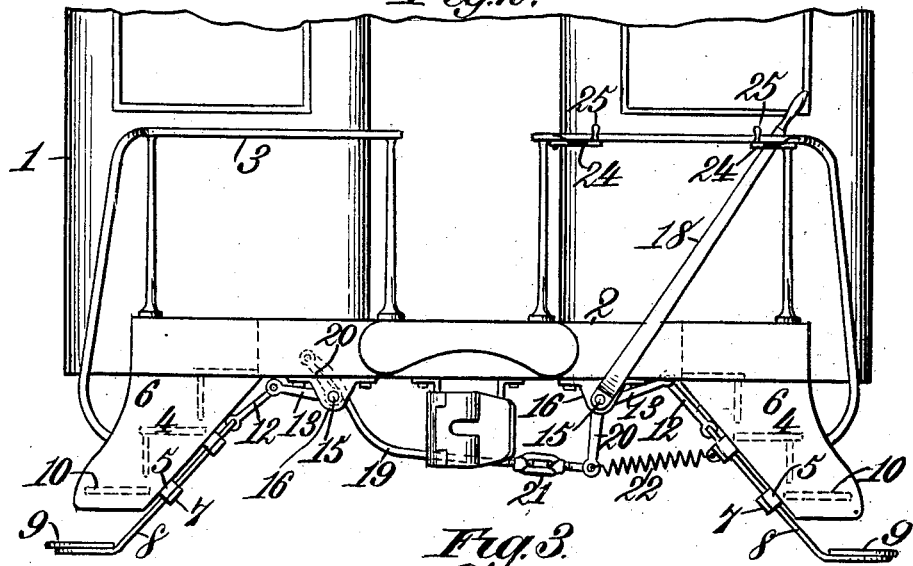
Figure 3:
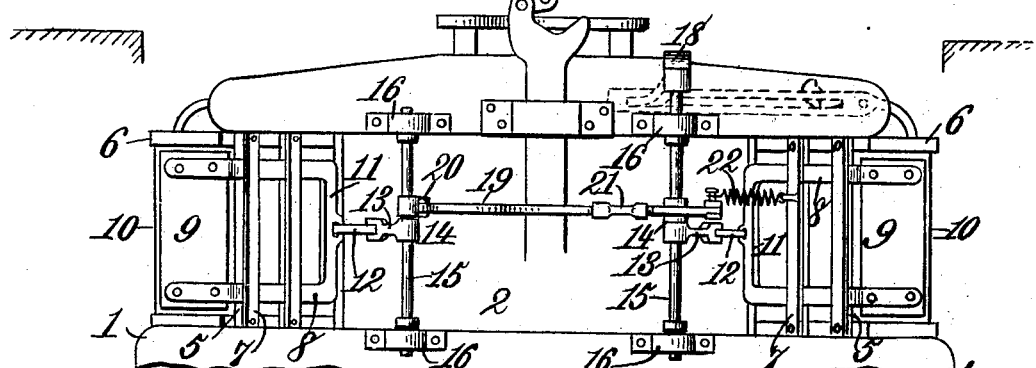

In the drawings: Figure 1 is an end elevation of a car partially broken away and shown in section and illustrating the improved extension step organization applied thereto and arranged for simultaneously operating the extension steps on opposite sides of the car, the extension steps being shown in elevated or inoperative position. Fig. 2 is an end elevation of a car showing the position of the parts when the extension steps are depressed or lowered. Fig. 3 is a bottom plan view of a car end showing the improved extension step organization applied thereto. Fig. 4 is an end elevation of a car end showing a modification in the construction and whereby the extension steps on opposite sides may be independently operated. Fig. 5 is a detail perspective view showing means for simultaneously operating extensible steps at opposite ends of a car, this means being partially broken through a portion thereof. Fig. 6 is a detail plan view of one of the hand rails or guards of the car showing the particular catch means for coöperating with the manually operative lever.

Similar characters of reference are employed to indicate corresponding parts in the several views.

Referring particularly to Figs. 1, 2 and 3, the numeral 1 designates a car having an end platform 2 provided with a hand or guard rail 3 on each side of the center and also with fixed steps 4 extending downwardly from the platform 2 at opposite sides of the latter. This construction is well known in railway cars and is shown to illustrate one application of the invention. The improved extension step organization, however, is not in the least restricted in its application and may be equally well employed on a street car having a closed dashboard or any other form of railway car equipped with fixed step means. It will also be understood that in the application of the improved extension step organization, railroad regulations and requirements as to the projection of the extension steps will be fully met, or the extension steps will not project beyond the prescribed limits when lowered or depressed into operative position.

In the form of the invention shown by Figs. 1, 2 and 3 the extension steps are connected for simultaneous operation, and specifically each series of fixed steps 4 has a plurality of guides 5 secured against the inner inclined wall or portion 6, the guides consisting preferably of transverse bars 7 for confining a yoked slide 8 having the free extremities secured to the underside of an extension 9, the latter step being closely housed or disposed under the lowermost step 10 of each series of fixed steps 4 when elevated, as clearly shown by Fig. 1. The particular manner of applying the extension step is just explained is preferred, but it will be understood that equivalent means may be used provided said latter means may be associated with the framing of the fixed steps as the preferred devices shown and above explained.

To the center of the upper cross member 11 of each slide yoke 8, a link 12 is movably secured and at its opposite extremity is attached to the end of an arm 13 of a bell-crank lever 14 secured on a rock-shaft 15. This rock-shaft 15 may be a short shaft mounted in suitable bearings as 16 secured to the under side of the car platform 2, or it may be an elongated shaft 17, as shown by Fig. 5, extending from one end of the car to the other so that the extension steps on the same side of the car may be simultaneously operated from either end of the car by means of hand levers 18 accessibly positioned in operative relation to the opposite car ends. In the construction shown by Figs. 1, 2 and 3, the mechanism thus far described is duplicated on opposite sides of the car, and the operating lever 18 is connected only to one of the rock-shafts 15, the movement of the lever and its shaft being imparted through the bell-crank 14 coöperating with the actuated shaft by a connecting rod 19 terminally attached to the arms 20 of the two bell-cranks, the connecting rod 19 being adjustable through the medium of a turn-buckle 21 to compensate for wear and to control the projection or depression of the extension steps. The connecting rod 19 is suitably bent or shaped to clear the coupling means on the car end, and it will be understood that this rod is not restricted to any precise shape, but may be modified to accommodate application thereof to the under side of car ends varying in structure or having different projecting means. The bell-cranks 14 may be integral devices, or have the arms 13 and 20 connected to each other, or they may be essentially two arms fixed on their shafts 15 by any suitable means. The arms 13 and 20 of the bell-crank 14 to the left, as shown by Figs. 1 and 2, are closer together than the similar arms of the opposite bell-crank to accommodate the movement of the connecting rod 19 and obtain an equal actuation of the extension steps, both in depressing and elevating said steps. To assist in the return of the several parts of the organization to normal position, as shown by Fig. 1, when the steps 9 have been depressed as shown by Fig. 2 and the operating lever 18 is released for movement towards the center of the car end, a spring 22 is connected at opposite extremities respectively to the arm 20 of the bell-crank 14 directly actuated by the lever 18 and an adjacent portion of the guide for the slide 8 nearest to the shaft 15 actuated by the lever 18. When the extension steps 9 are raised against the lowermost step 10 of the series of fixed steps 4, the lever 18 is positioned inwardly towards the center of the platform, as shown by Fig. 1, and held against movement by means which will be presently explained. When it is desired to depress the extension steps 9 the lever 18 is released and thrown outwardly as shown by Fig. 2 and also held against movement, and this actuation of the lever turns the shaft 15 to which it is directly connected outwardly and moves the arm 20 of the bell-crank on the same shaft inwardly towards the center of the under portion of the car, and the arm 13 of said bell-crank downwardly. The inward movement of the arm 20 expands the spring 22 and shoves the connecting rod 19 over towards the opposite side of the car and correspondingly throws both arms of the bell-crank outwardly and downwardly to depress the opposite step 9. When the lever 18 is released from the position shown and is moved inwardly towards the center of the platform, the tension of the expanded spring 22 comes into play and facilitates the restoration of the several parts to normal position, as shown by Fig. 1.

The hand rail 3 is slotted, as shown by Fig 6, as at 23 and in this slot the lever 18 has full movement. At opposite extremities of the slot are spring-actuated catches 24 which are normally pressed inwardly across the slot and may be manually released by grip devices 25 projecting upwardly from the free ends thereof and within easy reaching distance. This form of locking means is very simple and will effectively hold the lever 18 in either one of its two adjusted positions. The invention, however, is not limited to this precise form of catch or locking means for the lever, as any other suitable means may be employed.

In the modified form of construction shown by Fig. 4 the extension steps 9, slide yokes 8, guide means 7, shafts 15, bell-crank devices 14 having arms 13 and the particular relation of the extension steps to the fixed series of steps 4 at opposite sides of the car platform are similar to the like parts heretofore described and as shown by Figs. 1, 2 and 3. The shaft 15 may in this instance likewise consist of short shafts or elongated shafts similar to the shaft 17 shown by Fig. 5 and extending from end to end of the car. In this instance, however, the shafts 15 are independently operable and the arms 13 of the bell-crank devices are connected to the centers of the slide yokes 8, are shown by Fig. 5. In this instance springs 26 are connected at their upper terminals to a portion of the guides 7 and at their lower extremities through the medium of hooks or projections 27 to the slide yokes 8 adjacent to the steps 9. Each shaft 15 has a lever 28 secured thereto and projecting outwardly within easy reaching distance from the side of the car so that the extension steps may be operated from a platform or ground surface adjacent to the car sides. When either lever 28 is depressed the rock-shaft 15 connected thereto is correspondingly moved and the bell-crank actuated to cause the arm 13 thereof to depress the slide 8 attached thereto against the resistance of the spring 26, the step 9 being held depressed and the lever 28 secured against accidental displacement by a catch 29. As soon as the lever 28 is released, the spring 26 comes into play and operates to restore the parts to normal position and to dispose the extension step 9 under the lower fixed step 10 of the series of steps 4. These two positions are clearly illustrated at the right and left portions of Fig. 4. This independent operation of the extension steps will be found exceptionally advantageous where it is desired to have passengers enter or alight from one side of a car at either one or both ends of the latter.

It will be understood that the arms 13 and 20 may be in the form of cranks secured to the respective shafts 15 at distances from each other where the car structure may require a difference in spacing of the several elements included in the improved organization.

It will be observed that when the extension steps 9 are elevated they are fully disposed under the lower fixed step of each series of steps 4, no part of the extension steps projecting outwardly.

Many advantages will appear by practical use of the improved extension step means, and to accommodate various applications changes in the form, proportions, dimensions and minor details may be adopted without departing from the spirit of the invention.

Having thus fully described the invention, what is claimed as new, is:

1. The combination with a car platform having a series of fixed steps of ordinary structure at opposite sides, of rock shafts extending under the platform, slides carrying extension steps at their lower extremities and applied against the inner side of the series of fixed steps at the opposite sides of the platform, transverse bars applied against the slides and inner sides of the series of fixed steps to hold the said slides in associated relation to the said steps, connecting means directly interposed between the slides and the rock shafts, and manually operative lever means directly connected to at least one of the rock shafts, resilient means coöperating with a part of the said devices for assisting in returning the latter to normal position.

2. The combination with a car platform having a series of fixed steps of ordinary structure at opposite sides, of rock shafts applied to the under side of the platform at a distance from the said steps, slides applied to the inner side of the two series of fixed steps and each carrying an extension step at its lower extremity and foldable under the lowermost step of the series of fixed steps with which it coöperates, holding means applied over the inner portions of the slides and secured to the inner sides of the fixed steps to hold the slides in associated relation to the steps without modifying the construction of the latter, connecting means between the slides and the rock shafts, manually operative lever means directly connected to at least one of the rock shafts, and spring means for assisting in restoring the extension steps and the lever means to normal position.

3. The combination with a car end and platform having a series of fixed steps of ordinary construction, of a slide held in close movable relation to the inner side of the series of fixed steps and carrying a single extension step at its lower extremity, means extending transversely across the slide and secured to the fixed steps for operatively holding the slide against the latter without modifying the construction of the steps, the single extension step being free of attachment to the series of fixed steps except through the slide, and means for operating the extension step, the latter being completely elevatable under the lowermost of said fixed steps and having its outer edge adapted to be in rear of the outer edge of the lowermost fixed step.

4. The combination with a car end and platform having a series of fixed steps of ordinary construction at opposite sides, a slide applied against the inner side of each series of fixed steps and carrying a lower extension step elevatable under the lowermost fixed step, means extending across the slide for holding the latter in associated relation to the fixed steps without requiring a modification of the construction of the said steps, rock shafts extending under the platform on opposite sides of the center at a distance inwardly from the series of fixed steps and having means connected to the slides of the extension steps, the application of the rock shafts to the under side of the platform at a distance from the fixed steps permitting unrestricted and more positive operation of the slides carrying the extension steps, and means for operating the rock shafts whereby either one or both of the extension steps may be depressed or elevated.

5. The combination with a car having platforms at opposite ends provided with series of fixed steps at opposite sides, an extension step coöperating with each series of fixed steps and provided with a slide means, rock shafts extending under the car from one platform to the other on opposite sides of the center and connected to the slide means of the extension steps, each rock shaft controlling the simultaneous operation of two extension steps on one side of the car at opposite ends of the latter, and means for operating the rock shafts to depress or elevate the extension steps.

6. The combination with a car end having a platform provided with series of fixed steps of ordinary construction at opposite sides, an extension step coöperating with each series of fixed steps and provided with a slide means movably applied directly against the inner side of the fixed steps in each instance, means extending across the slide and also interposed between the latter and the fixed steps for holding the slide in associated relation to the steps without modifying the construction of the fixed steps, rock shafts extending under the platform on opposite sides of the center at a distance from the fixed steps and connected to the slide means of the extension steps, means for operating the rock shafts to depress or elevate either one or both of the extension steps, and spring means for assisting the return of the several parts to normal elevated position.

7. The combination with a car end having a platform provided with a series of fixed steps of ordinary construction at opposite sides, of an extension step coöperating with each series of fixed steps and provided with a slide means, rock shafts extending under the platform on opposite sides of the center at distances inwardly from the fixed steps and connected to the slide means of the extension steps, an adjustable connecting rod attached at opposite extremities to the rock shafts, and bent at one extremity for clearance purposes, and means directly connected to one of the rock shafts for simultaneously operating both rock shafts to uniformly depress and elevate the extension steps.

8. The combination with a car end having a platform provided with series of fixed steps of ordinary construction at opposite sides, of an extension step having slide means applied to the inner side of each series of fixed steps, rock shafts extending under the platform at distances inwardly from the fixed steps and connected to the centers of the slides at the upper ends of the latter, a connecting rod attached at opposite terminals to the rock shafts and bent at one extremity for clearance purposes, and means for actuating the rock shafts to elevate or depress the extension steps.

9. The combination with a car end having a platform provided with a series of fixed steps of ordinary construction at opposite sides, an extension step coöperating with each series of fixed steps and provided with a slide directly movable against the inner side of each series of fixed steps, rock shafts extending under the platform at distances inwardly from the fixed steps and connected to the centers of the upper ends of the slides, links and bell-crank levers interposed between and connected to the slides and rock-shafts, a connecting rod also attached to the bell-cranks, and means coöperating with the said rock shafts for elevating and depressing the extension steps.

10. The combination with a car end having a platform provided with series of fixed steps of ordinary construction at opposite sides, of an extension step coöperating with each series of fixed steps and provided with a slide means applied to the back portion of the fixed steps, rock shafts extending under the platform at distances inwardly from the fixed steps and connected to the upper extremities of the slide means, an adjustable connecting rod between the rock shafts, having one extremity bent for clearance purposes, a spring means attached to one of the rock shafts and an adjacent fixed means for restoring the rock shafts and extension steps to normal position, means secured directly to one of the rock shafts for simultaneously actuating both shafts to unitedly depress and elevate the extension steps, and means for locking the rock shaft operating means in either one of two positions.

In testimony whereof I have hereunto set my hand in presence of two subscribing witnesses.

EUGENE W. FUHR.

Witnesses:
JAMES L. NORRIS, JR.,
CHAS. S. HYER.